(12) United States Patent
Fickett (10) Patent No.: US 6,983,853 B1
(45) Date of Patent: Jan. 10, 2006

(54) PORTABLE MODULAR STORAGE SUPPORT DEVICE

(76) Inventor: Glenn A. Fickett, 1135 Sunburst La., Tempe, AZ (US) 85284

( * ) Notice: Subject to any disclaimer, the term of this patent is extended or adjusted under 35 U.S.C. 154(b) by 109 days.

(21) Appl. No.: 10/263,231

(22) Filed: Oct. 2, 2002

Related U.S. Application Data (63) Continuation-in-part of application No. 10/043,420, filed on Jan. 10, 2002, now Pat. No. 6,843,380, which is a continuation-in-part of application No. 09/653,834, filed on Sep. 1, 2000, now abandoned, which is a continuation-in-part of application No. 29/115,420, filed on Dec. 14, 1999, now Pat. No. Des. 437,164.

(51) Int. Cl.
*A47F 7/00* (2006.01)

(52) U.S. Cl. ............................ 211/18; 211/22; 248/303; 248/307

(58) Field of Classification Search ................ 403/170, 403/384, 385, 386, 349; 211/18, 105.1, 19, 211/87.01, 103, 107, 96, 208, 182, 112; 248/251, 231.91, 200.1, 307, 303
See application file for complete search history.

(56) References Cited

U.S. PATENT DOCUMENTS

| | | | |
|---|---|---|---|
| 284,090 A * | 8/1883 | Tingle ........................ 211/75 |
| 615,995 A | 12/1898 | Leonard |
| 1,050,974 A * | 1/1913 | Moore .................. 248/295.11 |
| 1,481,730 A * | 1/1924 | Oakley ..................... 211/123 |
| 1,667,669 A | 4/1928 | Megee |
| 2,243,794 A * | 5/1941 | Dunn ........................ 4/576.1 |
| 2,767,003 A * | 10/1956 | Gilmont .................... 403/385 |
| 2,835,503 A | 5/1958 | Humphries et al. |
| 3,076,556 A * | 2/1963 | White ..................... 211/105.1 |
| 3,765,634 A * | 10/1973 | Stempel .................... 248/250 |
| 3,804,432 A | 4/1974 | Lehrman |
| 3,981,491 A | 9/1976 | Snyder |
| 3,998,476 A | 12/1976 | Kazmark, Sr. |
| 4,037,858 A | 7/1977 | Adams |
| 4,101,107 A * | 7/1978 | Antoszewski ............ 248/218.4 |
| 4,316,547 A * | 2/1982 | Varon ...................... 211/105.1 |
| 4,348,034 A | 9/1982 | Welt |

(Continued)

FOREIGN PATENT DOCUMENTS

EP 0597150 5/1994

(Continued)

*Primary Examiner*—Blair M. Johnson
(74) *Attorney, Agent, or Firm*—Frank J. McGuire (57) ABSTRACT

A modular storage support device supports items suspended above a floor. The device rests upon the floor and comprises a vertical member extending upwardly which has an upper end and a lower end. A base member has a base vertical portion which receives the lower end of the vertical member and a U-shaped portion which is oriented perpendicular to the vertical member. The U-shaped portion has two leg portions extending laterally with respect to the sides thereof Two L-shaped support legs are received in one of the leg portions and extend forward therefrom. A foot portion extends downwardly from each of the L-shaped support legs to rest upon a floor. An L-shaped wall brace is received within the upper end of the vertical member and extends upwardly and then rearwardly from vertical member to engage a vertical wall. One or more supports are slidably secured to the vertical member and the upwardly extending section of the L-shaped wall brace. Each of the one or more supports have at least one support arm being mounted thereto. Each of the at least one support arms is parallel to, shorter than and positioned between the support legs and engages an item for support of said item.

13 Claims, 12 Drawing Sheets

U.S. PATENT DOCUMENTS

| | | | | |
|---|---|---|---|---|
| 4,456,246 | A | * | 6/1984 | Szabo .......................... 482/98 |
| 4,523,773 | A | | 6/1985 | Holtz |
| 4,541,535 | A | * | 9/1985 | Bartholomew ............... 211/96 |
| 4,550,835 | A | * | 11/1985 | Lynch ......................... 211/24 |
| 4,618,035 | A | | 10/1986 | Mao |
| 4,717,105 | A | * | 1/1988 | Stefani .................. 248/297.31 |
| 4,807,837 | A | | 2/1989 | Gawlik et al. |
| 4,869,448 | A | * | 9/1989 | Kenyon ...................... 248/118 |
| 4,944,478 | A | * | 7/1990 | Sullivan .................. 248/205.7 |
| 5,050,785 | A | | 9/1991 | Hays |
| 5,078,276 | A | | 1/1992 | Rogge et al. |
| 5,083,729 | A | * | 1/1992 | Saeks et al. .................. 211/22 |
| 5,161,768 | A | | 11/1992 | Sarabin |
| 5,222,707 | A | | 6/1993 | Myers .................... 248/206.1 |
| 5,294,006 | A | * | 3/1994 | Deschino .................... 211/18 |
| 5,332,104 | A | * | 7/1994 | Santella ...................... 211/18 |
| 5,335,782 | A | * | 8/1994 | Herzog .................. 198/836.3 |
| 5,415,299 | A | * | 5/1995 | Usner ..................... 211/105.1 |
| 5,458,305 | A | | 10/1995 | Woodward |
| 5,477,789 | A | | 12/1995 | Von Gunten |
| 5,501,544 | A | * | 3/1996 | Cairns ........................ 403/400 |
| 5,524,772 | A | * | 6/1996 | Simmons ....................... 211/4 |
| 5,642,820 | A | | 7/1997 | Angeles |
| 5,794,828 | A | | 8/1998 | Colan et al. |
| 5,842,581 | A | * | 12/1998 | Graefe ......................... 211/17 |
| 5,983,556 | A | * | 11/1999 | Zaloga ....................... 43/57.1 |
| RE36,669 | E | * | 4/2000 | Zilincar, III ............. 211/86.01 |
| 6,068,084 | A | * | 5/2000 | Taormina .................... 182/113 |
| D437,164 | S | | 2/2001 | Fickett |
| 6,216,882 | B1 | * | 4/2001 | Strunck et al. ............... 211/18 |
| 6,220,460 | B1 | * | 4/2001 | Pan ......................... 211/87.01 |
| 6,345,797 | B1 | * | 2/2002 | Ming-Hsiao ............. 248/309.2 |
| 6,494,327 | B2 | * | 12/2002 | Huang ......................... 211/17 |
| 6,499,186 | B1 | * | 12/2002 | Arentsen .................... 16/87 R |
| 6,729,478 | B1 | * | 5/2004 | Boers .......................... 211/18 |
| 2002/0158033 | A1 | * | 10/2002 | Chen ......................... 211/103 |

FOREIGN PATENT DOCUMENTS

| | | |
|---|---|---|
| FR | 2458444 | 1/1981 |
| FR | 2711109 | 4/1995 |
| GB | 14740 | 0/1895 |
| WO | WO 99/33695 | 7/1999 |

* cited by examiner

PORTABLE MODULAR STORAGE SUPPORT DEVICE

RELATED APPLICATION

This is a continuation-in-part of patent application Ser. No. 10/043,420 filed Jan. 10, 2002, now U.S. Pat. No. 6,843,380 which is a continuation-in-part of patent application Ser. No. 09/653,834 filed Sep. 1, 2000, now abandoned, which is a continuation-in-part of design patent application Ser. No. 29/115,420 filed on Dec. 14, 1999, now U.S. Pat. No. D437,164.

TECHNICAL FIELD

This invention relates in general to a modular storage support device, and, and, more particularly, to a portable device having a modular format which is easily transported and assembled.

BACKGROUND OF THE INVENTION

Many individuals prefer to store items off the floor to minimize space requirements and the like. However, most such storage devices require permanent installation which may be impractical or undesirable as in an hotel, apartment or condominium setting. In addition, most such structures have a particular configuration which cannot be altered as an individual's needs change. Thus, it is desirable to have a support structure which is easily assembled, portable, and does not demand permanent structure, and, when disassembled, takes up only minimal space. Further, another desireable feature is a modular nature to allow such support structures to be easily customized for a particular user and altered as that user's needs change over time.

U.S. Pat. No. 5,642,820 entitled "Portable Storage Support Structure" which issued on Jul. 1, 1997 to Angeles discloses a bicycle support structure adapted for resting on a floor and leaning against a wall.

U.S. Pat. No. 615,995 entitled "Bicycle Support" which issued on Dec. 13, 1898 to Leonard shows a free standing bicycle support having several sets of arms K extending from a vertical pole F. Hooks P are at the end of the arms K.

U.S. Pat. No. 5,222,707 entitled "Portable Bicycle Repair Stand" which issued on Jun. 29, 1993 to Myers shows a portable bicycle repair stand which may be attached to a vertical surface via suction cup devices 23.

U.S. Pat. No. 3,981,491 entitled "Work Stand For Bicycles" which issued on Sep. 21, 1976 to Snyder provides a free standing work stand for bicycles comprising a vertical support assembly with angular feet 14.

U.S. Pat. No. 5,477,789 entitled "Shelf Structure" which issued on Dec. 26, 1995 to Von Gunten shows a shelf structure supported on a floor and against a wall with no mechanical connections between a post and the wall or floor.

None of the known prior art disclose the device set forth herein.

SUMMARY OF THE INVENTION

It is an object of this invention to provide a modular support structure which is easily assembled, portable, and does not demand permanent structure.

It is a further object of this invention to provide a modular support structure which is easily disassembled and, when disassembled, takes up minimal space.

It is still another object to provide a modular support structure which is modular in nature thereby allowing users to easily customize a structure and to alter the structure as that user's needs change over time.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

A modular storage support device 10 supports differing items suspended above a floor 12. Device 10 rests upon floor 12 and comprises a vertical member 16 extending upwardly which has an upper end 18 and a lower end 20. A base member 22 has a base vertical portion 21 which receives lower end 20 of vertical member 16 and a U-shaped portion 23 which is oriented perpendicular to vertical member 16. U-shaped portion 23 has two leg portions 27 extending laterally with respect to the sides thereof. Two L-shaped support legs 30 are received in a respective one of leg portions 27 and extend forward therefrom. A foot portion 36 extends downwardly from each L-shaped support leg 30 to rest upon floor 12. An L-shaped wall brace 40 is received within upper end 18 of vertical member 16 and extends upwardly and then rearwardly from vertical member 16 to engage a vertical wall 14. One or more supports 49 are slidably secured to vertical member 16 and upwardly extending section of L-shaped wall brace 40. Each of the one or more supports 49 have at least one arm 51 being mounted thereto. Each of the at least one arms 51 is parallel to, shorter than and positioned above and between L-shaped support legs 30 and engages an item for support of said item.

Figure 1:
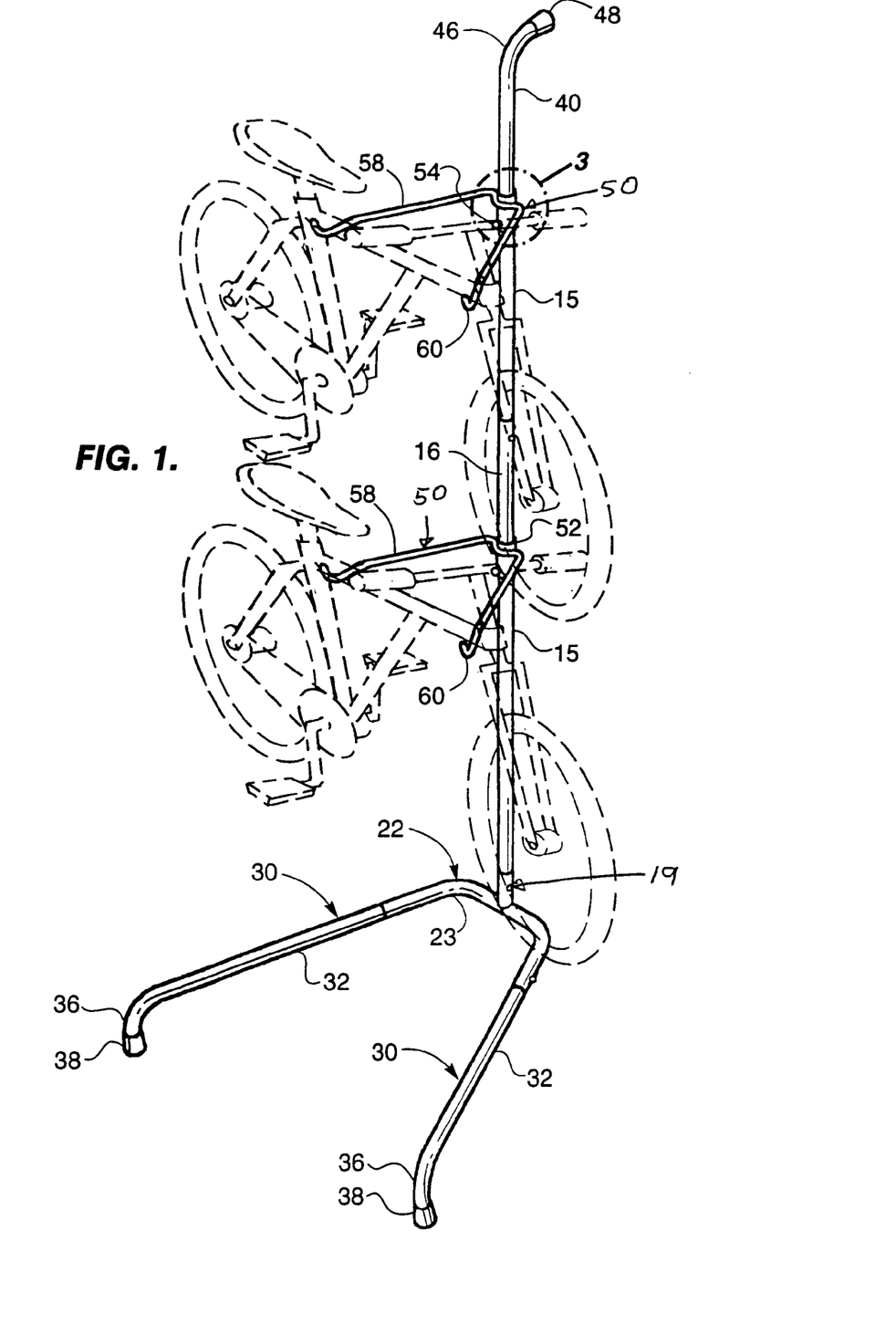
FIG. 1 is a perspective view of a module used as a support structure of the present invention designed to support a pair of bicycles.
Figures 2, 3, 4:
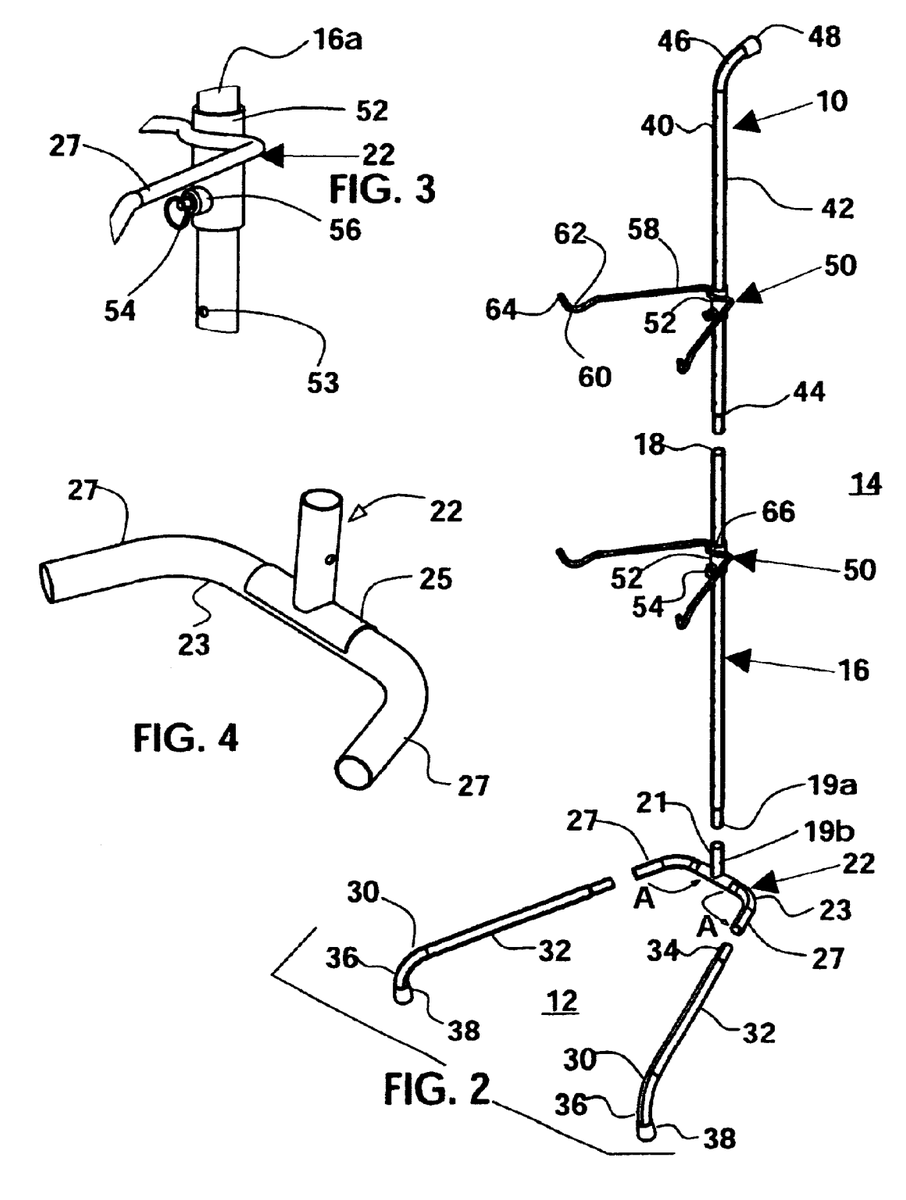
FIG. 2 is an exploded view of an alternate embodiment of the structure shown in FIG. 1.
FIG. 3 is a close up view of the circled area 3 in FIG. 1.
FIG. 4 is a perspective view of a base member employed in the present invention.

One embodiment of device 10 of the present invention is best seen in FIGS. 1–3 and is adapted for supporting one or two bicycles (shown in shadow) suspended above floor 12. In addition to resting on floor 12, device 10 leans against vertical wall 14. As shown, device 10 is comprised of round tubing though those skilled in the art will recognize that other material, for example, square tubing, can be utilized.

As shown, vertical member 16 of device 10 includes at least one vertical portion 15 whose major axes are oriented vertically. Each vertical portion 15 has an upper end 18 and a narrowed lower end 20. The narrowed lower end 20 is telescopically received within the upper end 18 of an abutting vertical portion 15 whereby in combination the three vertical portions 15 result in vertical member 16. A snap 19 comprising snap pin 19a in lower end 20 mating with a corresponding hole 19b in upper end 18 is preferably used to secure one vertical portion 15 to an abutting vertical portion 15. Once secured, simply depressing snap pin 19a disengages vertical portions 15.

It will be understood by those skilled in the art that the number of vertical portions 15 is not critical to the invention, that vertical member 16 can consist of one or as many vertical portions 15 as desired. The choice of three vertical portions 15 in the illustrated embodiment is for minimizing the length of the packaging containing the goods and is not critical for purposes of the invention.

Device 10 further comprises base member 22 which includes a base vertical portion 21 which telescopically receives lower end 20 of vertical member 16. Another snap 19 comprising snap pin 19a in lower end 20 mating with a corresponding hole 19b in base vertical portion 21 is preferably used to secure vertical member 16 to base member 22. Once secured, simply depressing snap pin 19a disengages vertical member 16 and base member 22.

Extending horizontally from base vertical portion 21 is generally U-shaped portion 23 having a base portion 25 generally oriented horizontally and parallel to wall 14 and two leg portions 27 also extending generally horizontally but extend laterally at an angle from wall 14 on one side of vertical member 16. In the preferred embodiment, leg portions 27 are not perpendicular to wall 14 but extend at an angle A from base portion 25. In the most preferred embodiment, angle A is about 113°.

Device 10 further includes the two L-shaped support legs 30 having a horizontally oriented elongated portion 32 having a narrowed wall end 34 telescopically received in leg portions 27 and extending therefrom and foot portion 36 extending downwardly from elongated portion 32 to rest upon floor 12. Snaps 19 are used to secure support legs 30 to base member 22 as previously described. In addition, caps 38 are provided for the end of foot portions 36 engaging floor 12 to prevent scratching of same when device 10 is assembled as well as frictional engagement therewith.

Device 10 further comprises L-shaped wall brace 40 having an elongated vertical portion 42 having a narrowed lower end 44 telescopically received within upper end 18 and extending upwardly therefrom and a wall brace portion 46 extending directly opposite support legs 30 from elongated vertical portion 42 to engage wall 14. Snaps 19 are also used to releasably secure wall brace 40 to vertical member 16 as previously described while a third cap 48 is provided for the end of wall brace portion 46 engaging wall 14 to also prevent damage thereto and to frictionally engage said wall.

Device 10 further includes bicycle supports 50 which are secured to either vertical member 16 or elongated vertical portion 42. Such securement is effected by support 49 comprising a collar 52 which slidably receives vertical member 16 and elongated vertical portion 42 therein. As best seen in FIG. 3, a quick release pin 54 is inserted into a hole 56 in collar 52 and engages with one of a plurality of mating holes 53 provided in either a vertical member 16a or an elongated vertical portion 42a.

Extending parallel to and positioned between support legs 30 are arms 51 comprising, in this embodiment, a pair of support arms 58 which are mounted to collar 52 of each bicycle support 50. Support arms 58 are shorter than support legs 30. The distal end of each support arm 58 further has a holding member 60 whose upper surface is formed into an arcuate groove 62 of sufficient size to receive a bicycle tubular frame member. The grooves 62 of each pair of support arms 58 are generally coaxial and are preferably provided with a rubber cover 64 to prevent scratching of the bicycle frame as well as provide frictional engagement therewith.

In the illustrated embodiment, each pair of support arms 58 are formed from a single piece of solid round bar which is provided with an arcuate center groove 66 which groove conforms to and is welded to collar 52.

Figure 5:
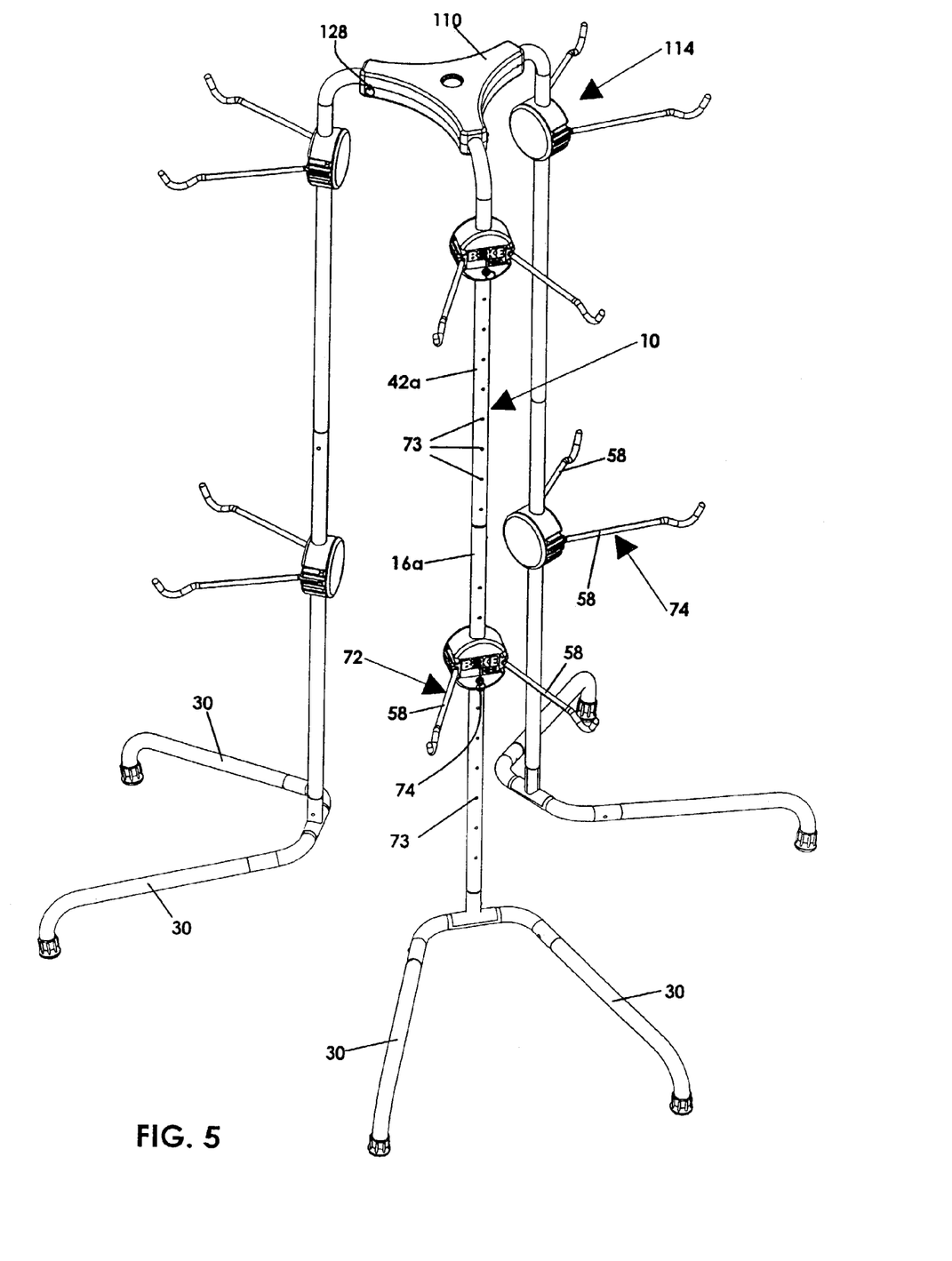
FIG. 5 is a perspective view of an alternate embodiment of the support structure utilizing three modules which is adapted to be free standing.
Figure 8:
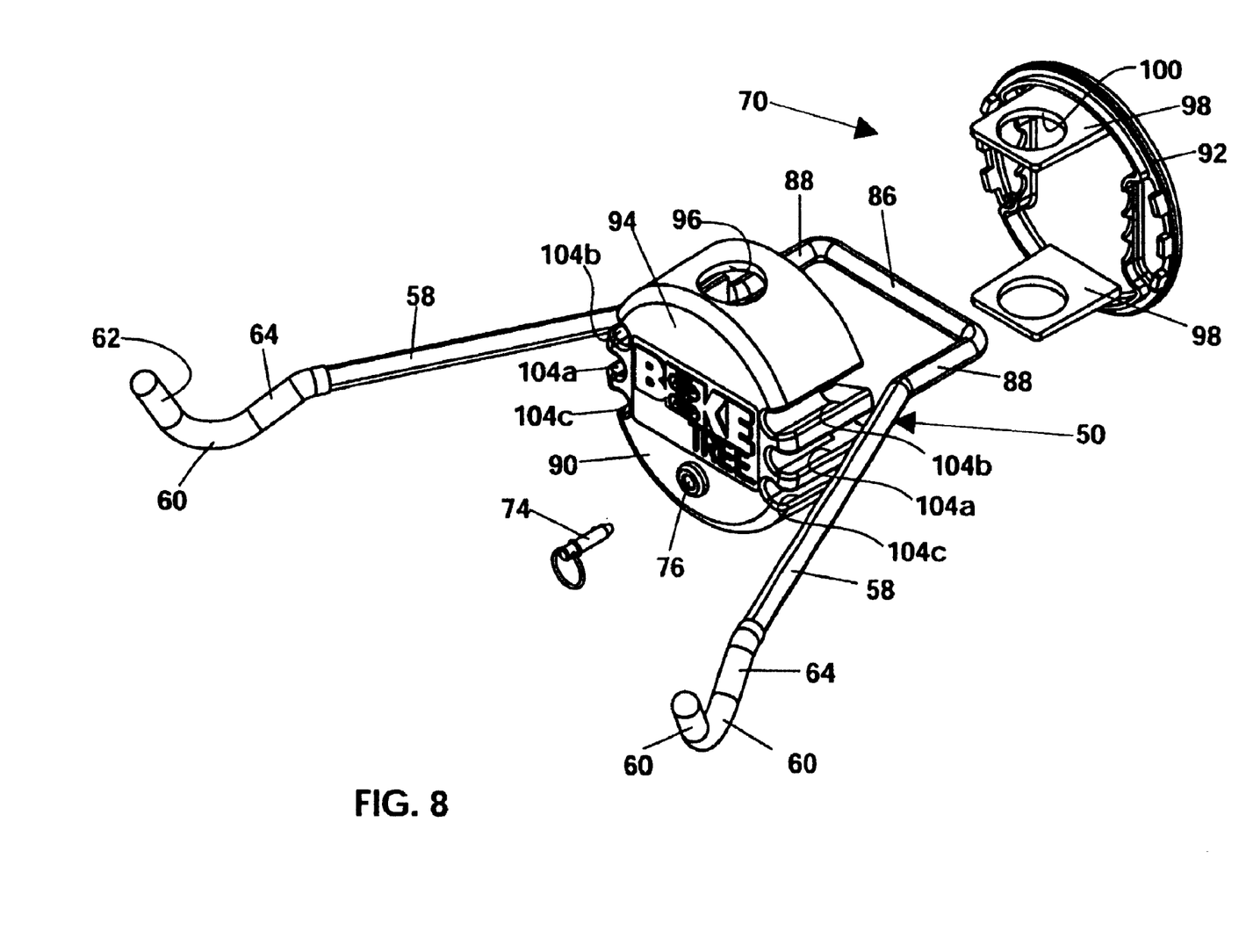
FIG. 8 is an exploded front and top perspective view of a hub used in the embodiment of FIG. 5.

An alternate embodiment shown in FIGS. 5 and 8 utilizes one or more variant bicycle supports 70 which are secured to either vertical member 16 or elongated vertical portion 42. Such securement is effected wherein support 70 comprises a hub 72 which slidably receives vertical member 16a and elongated vertical portion 42a therein. A quick release pin 74 is inserted into a hole 76 in hub 72 and engages with one of a plurality of mating holes 73 provided in either a vertical member 16a or an elongated vertical portion 42a.

In the embodiment of FIGS. 5 and 8, parallel to and positioned between support legs 30 are support arms 58 which are mounted to hub 72 of each bicycle support 50 as described in more detail below.

That portion of support arms 58 which extends through hub 72 are formed from a single piece of solid round bar which is provided with an straight center 86 having two short straight parallel sides 88 extending laterally from said center 86. Support arms 58 extend as previously described in connection with FIGS. 1–3 from the distal end of sides 88.

As best seen in FIG. 8, hub 72 preferably comprises a front section 90 and a rear section 92 with center 86 captured therebetween. In the preferred embodiment, front section 90 is shaped as a cylinder shaped having a sidewall 93 and a disk 94 covering one end thereof and an open end 95. Those skilled in the art will recognize that the many other shapes are possible for hub 72 and its components. On opposing sides of front section 90, two openings 96 are provided which are adapted to slidably receive vertical member 16a and elongated vertical portion 42a therein.

Rear section 92, in the illustrated embodiment, is disk shaped and sized to cover open end 95 of front section 90. Two parallel tabs 98 extend laterally from opposing sides of rear section 92 and have openings 100 therethrough which are adapted to slidably received vertical member 16a and elongated vertical portion 42a therein. When rear section 92 engages front section 90, tab openings 100 align with openings 96 to slidably receive vertical member 16 and elongated vertical portion 42 therein.

To easily align rear section 92 and front section 90, two parallel walls 102 extend from each side of an opening 96 across the interior of front section 90 to the corresponding side of opposing opening 96. Walls 102 are positioned and sized to receive tabs 98 therebetween.

To secure support arms 58 to hub 72, at least one pair of grooves 104 are provided positioned 180 degrees from each other along the periphery of sidewall 93. Grooves 104 are adapted to receive sides 88 of a single pair of support arms 58 from one bicycle support 50. In the preferred embodiment, three pairs of grooves 104 are provided, one pair 104a at 90 degrees from openings 96 and 100, the other two pairs 104b and 104c, aligned at an acute angle to the 90 degree pair. The latter two pairs 104b and 104c are angled to receive those bicycles which have an angled frame (i.e. women's bicycles).

Figure 9:
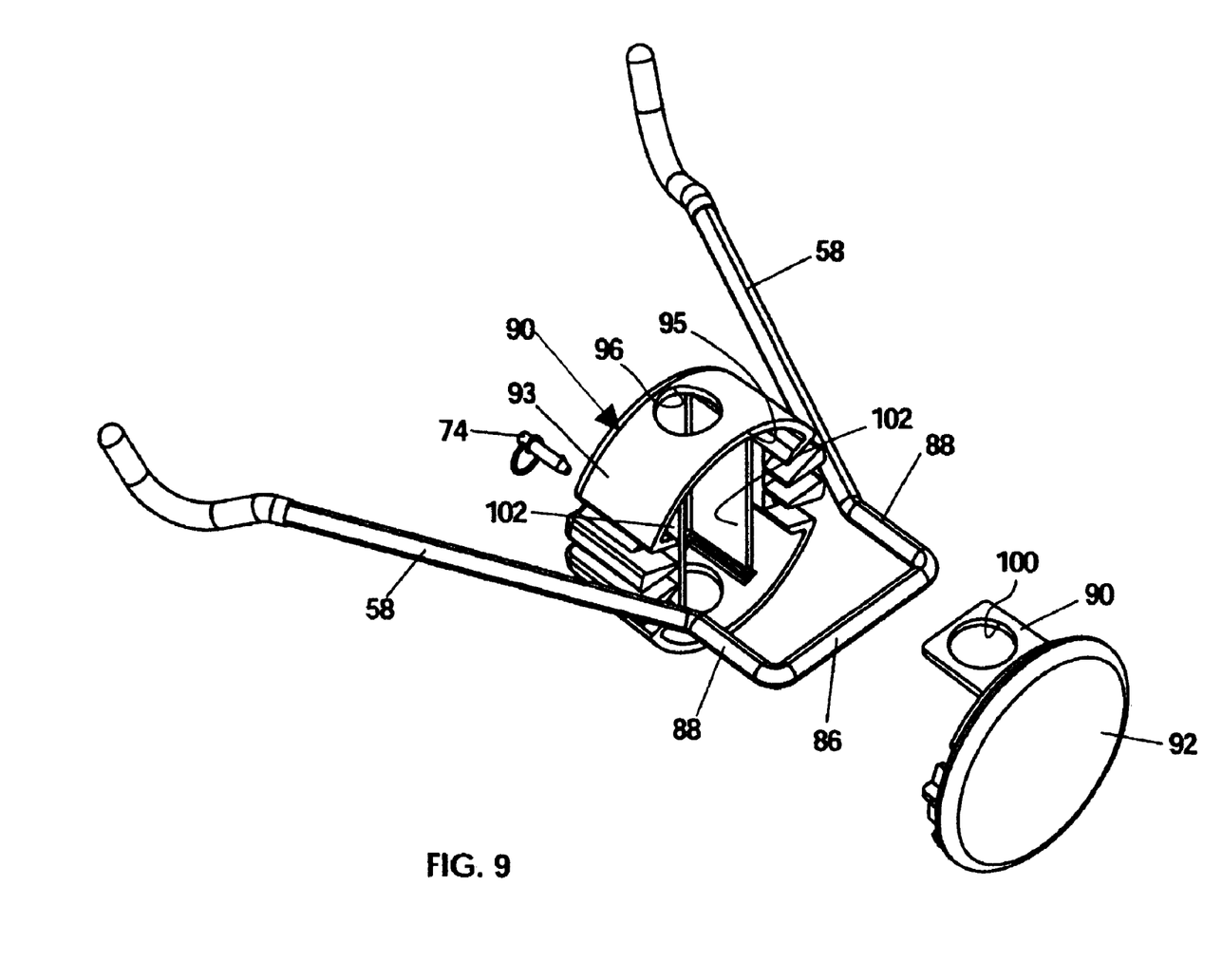
FIG. 9 is an exploded rear and top perspective view of the hub of FIG. 8.

To use the alternate embodiments of FIGS. 5, 8 and 9, hub 72 is assembled with bicycle support 50 positioned between front section 90 and rear section 92. The user positions sides 88 as desired in a selected pair of grooves 104 and then hub 72 is slid over vertical member 16a or elongated vertical portion 42a and positioned as desired. Quick release pin 74 is inserted into hole 76 and one of the mating plurality of holes 73 and the device is ready to receive a bicycle. Removal and insertion of quick release pin 74 allows a user to slide or secure hub 72 to a desired vertical location as needed.

When assembled as shown in FIG. 1, the weight of the bicycles (shown in shadow) is between vertical member 16 and foot portions 36. Since the weight in that position, device 10 is urged towards wall 14 by a rotation about foot portions 36. Wall brace portion 46 prevents such rotation but the force generated secures device 10, and its bicycles, firmly in position.

The use of snaps 19a and wing screws 54 or quick release pins 74 allows device 10 to be quickly set up and torn down as needed.

Figure 10:
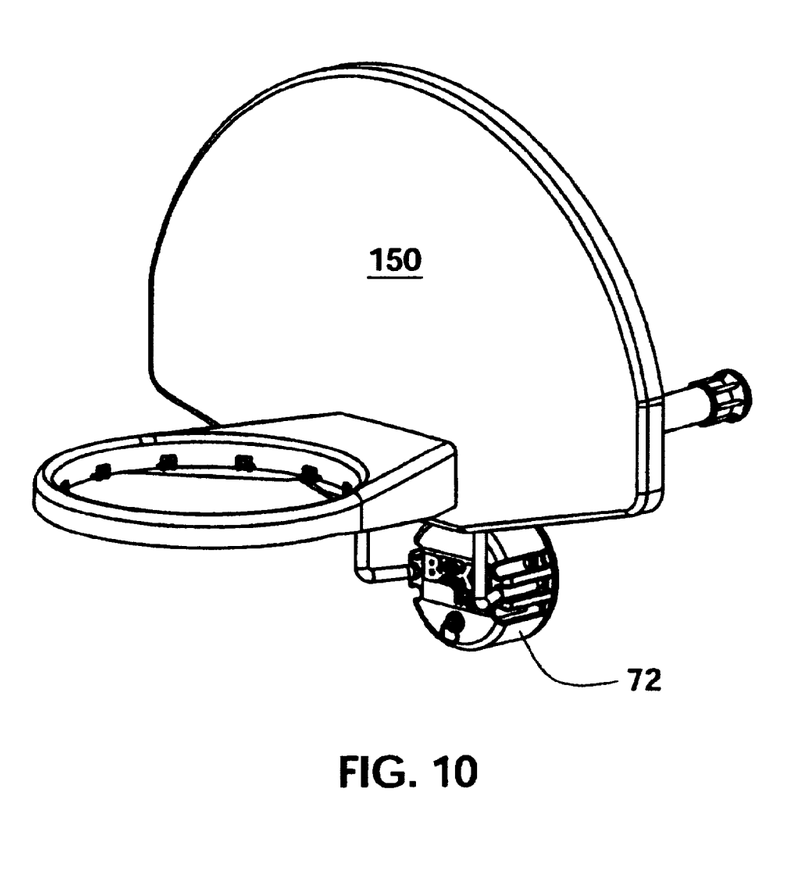
FIG. 10 is a perspective view of the hub supporting a basketball hoop.
Figure 11:
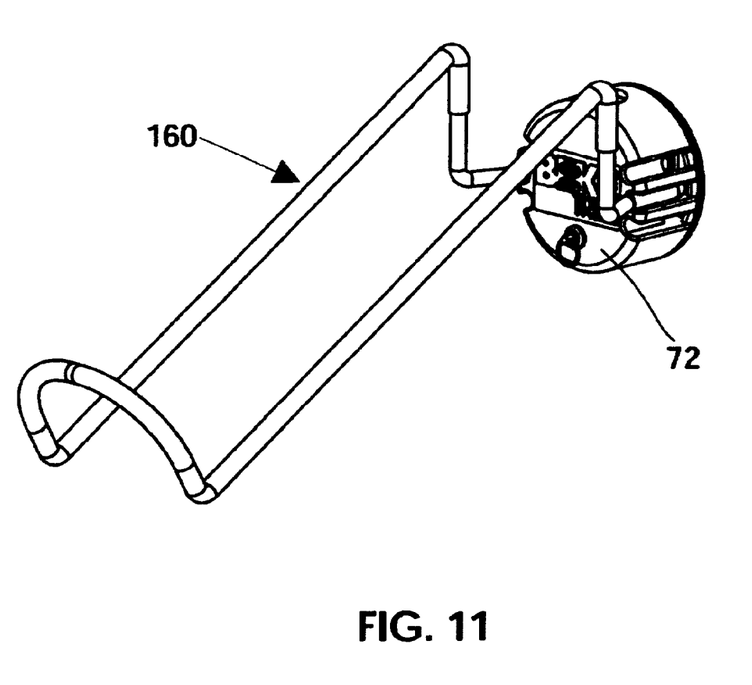
FIG. 11 is a perspective view of the hub supporting a canoe or kayak support device.

One advantage of the use of hub 72 is the ability to utilize a plurality of supports 49. By way of example, in FIG. 10 a basketball hoop 150 is shown mounted to hub 72 while in FIG. 11, a boat hook device 160 suitable for mounting kayaks or canoes is mounted to hub 72. Those skilled in the art will recognize that many almost any item can be suspended from device 10 as described, including, but not limited to, shelving, luggage, clothing and the like.

Figure 6:
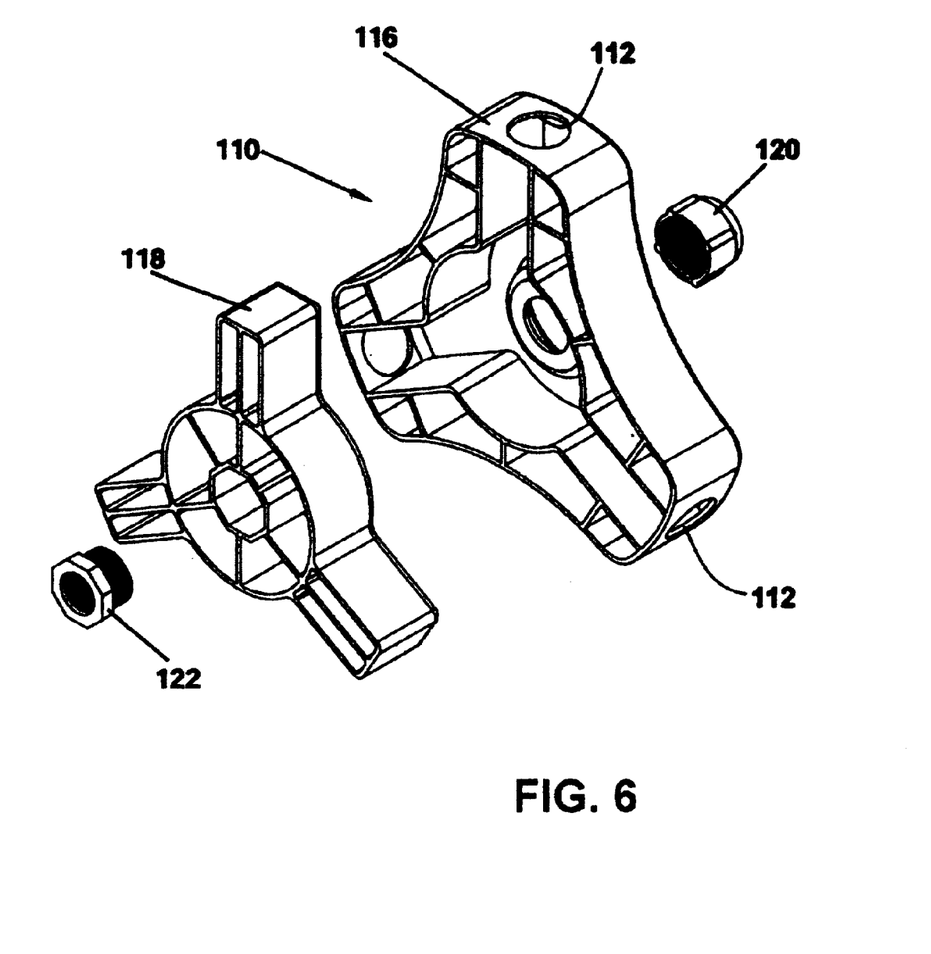
FIG. 6 is an exploded view of one embodiment of a center connector for the free standing embodiment of FIG. 5.
Figure 7:
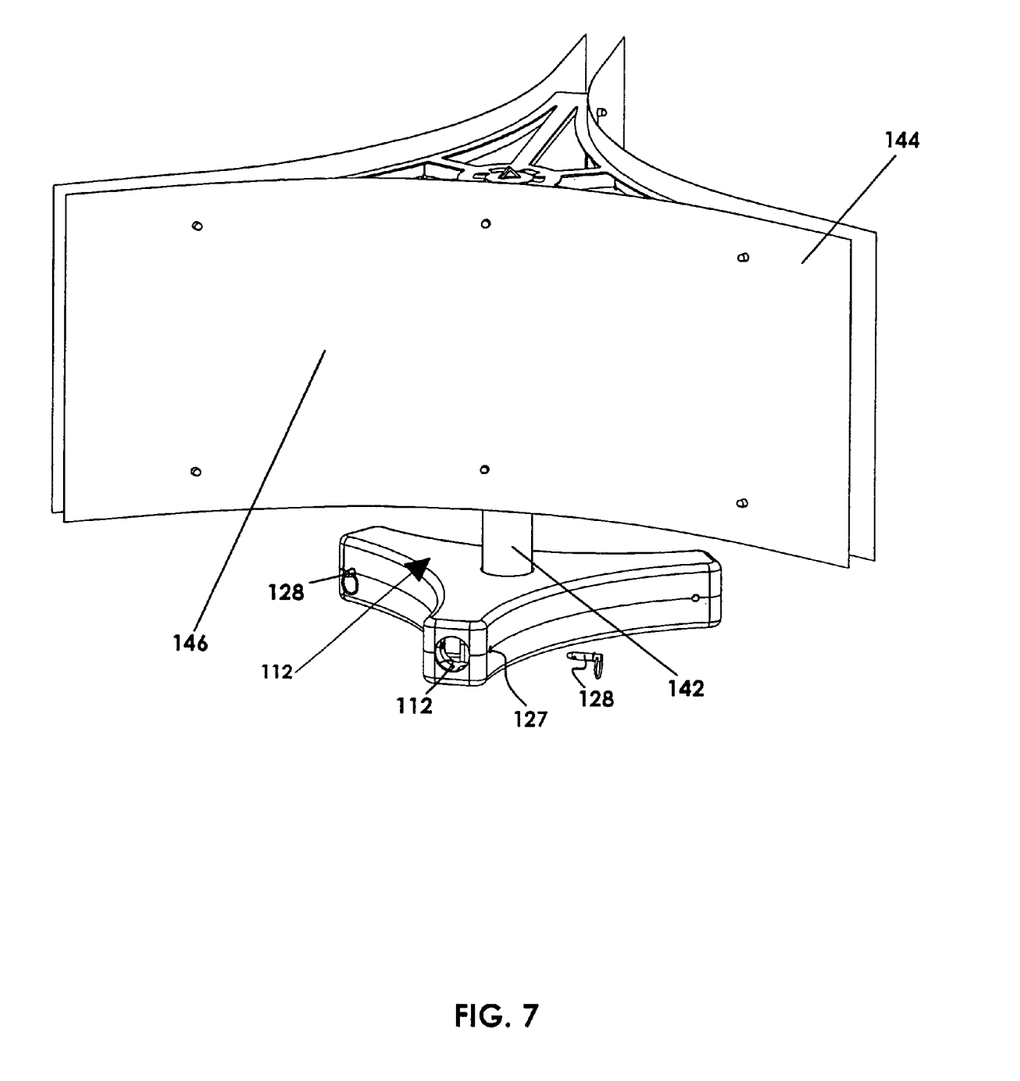
FIG. 7 is a perspective view of another embodiment of the center connector for the free standing embodiment of FIG. 5.

In an alternate embodiments best seen in FIGS. 5–7, a center connector 110 is provided with openings 112. Openings 112 are adapted to receive wall brace portion 46. In the illustrated and most preferred embodiments, three openings aligned at 120 degrees from each other are provided whereby three devices 10 can be secured to each other to provide a free standing bicycle support structure 114. Those skilled in the art will recognize that other embodiments using two or four devices 10 are possible, though with some modifications, namely, lengthening wall brace portion 46 in the four device 10 variation to avoid having bicycles interfere with one another in that embodiment.

As illustrated in FIG. 6, in one embodiment center connector 110 is constructed using an upper piece 116 secured to a lower piece 118 by a nut 120 and bolt 122 combination. However, in the presently preferred embodiment shown in FIG. 7, center connector 110 is a one piece unit. Further, in this embodiment, holes 127 are formed in center connector 110 which area adapted to receive quick release pins 128. Holes 127 are positioned proximate to openings 112 and align with corresponding holes 130 formed in the end of wall brace portion 46 received within openings 112. Quick release pins 128 provide additional stability by preventing an accidental disengagement, as, for example, when removing a bicycle from device 10.

Lastly, the use of center connector 110 is favored in, for example, retail stores for display of bicycles. In one shown in FIG. 7, a hole 140 is provided in the middle of center connector 112 which is adapted to receive a post 142 having a banner 144 mounted thereon for display purposes. Banner 144 includes indicia 146 having, for exemplary purposes only, advertising messages contained thereon.

Figure 12:
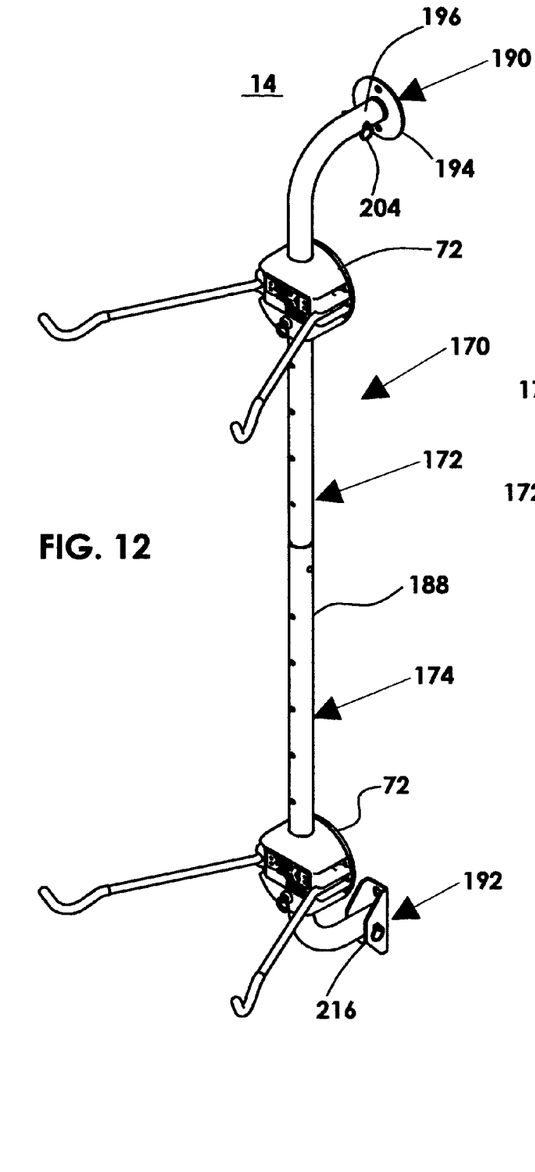
FIG. 12 is a perspective view of a wall mount version of the present invention.
Figure 13:
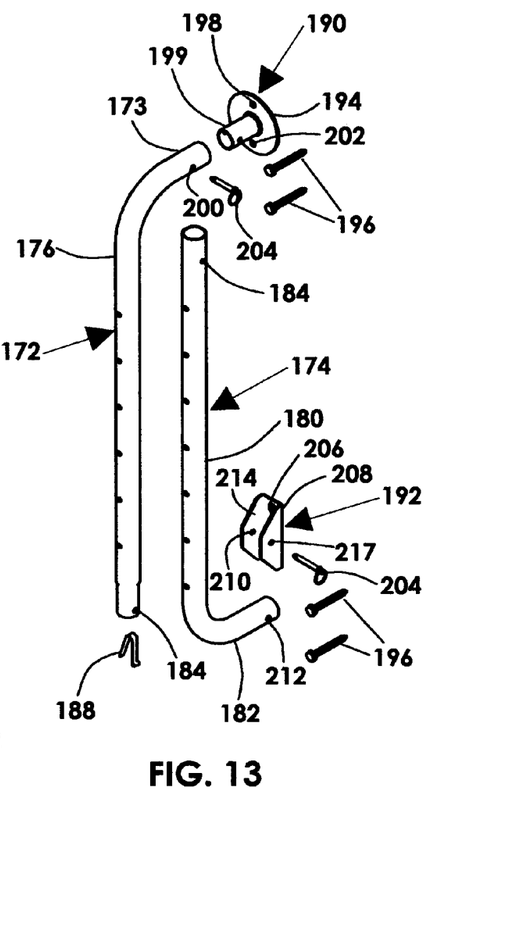
FIG. 13 is an exploded perspective view of the embodiment of FIG. 12.

In the alternate embodiment of FIGS. 12 and 13, a support device 170 comprises an upper L-shaped member 172 and a lower L-shaped member 174. Upper member 172 comprises an upper vertical leg 176 and an upper horizontal leg 178 while lower member 174 comprises a lower vertical leg 180 and a lower horizontal leg 182. In the preferred embodiment, an end of upper vertical leg 176 opposite upper horizontal leg 178 is slidably received within an end of lower vertical leg 180 opposite lower horizontal leg 182. When so received, holes 184 in both upper vertical leg 176 mate with corresponding holes 186 in lower vertical leg 180, said holes 184 and 186 being adapted to receive a quick release pin 188 therein for securing L-shaped members 172 and 174 to each other.

When L-shaped members 172 and 174 are thusly secured, horizontal legs 178 and 182 are parallel and extend in the parallel direction from vertical legs 176 and 180. The ends of horizontal legs 178 and 182 opposite vertical legs 176 and 180, respectively, are adapted to releasably mount to upper wall mount 190 and lower wall mount 192, such wall mounts 190 and 192 being mounted to vertical wall 14.

In the presently preferred embodiment, upper wall mount 190 comprises a disk 194 which is positioned flat to vertical wall 14. Nails or screws 196 are driven through nail holes 198 in disk 194 into vertical wall 14 to provide support to upper wall mount 190. Extending outwardly from the center of disk 194 is a cylinder 199 which is slidably received with end of upper horizontal leg 178 opposite upper vertical leg 176. When so received, holes 200 in upper horizontal leg 178 mate with corresponding holes 202 in cylinder 199, said holes 200 and 202 being adapted to receive a quick release pin 204 therein thereby releasably securing upper horizontal leg 178 to cylinder 199.

In one embodiment, lower wall mount 192 comprises a plate 206 which is positioned flat to vertical wall 14. Nails or screws 196 are driven through nail holes 208 in plate 206 into vertical wall 14 to provide support to lower wall mount 192. Extending outwardly and parallelly from the edges of plate 206 are two support walls 210 which are adapted to receive end of lower horizontal leg 182 opposite lower vertical leg 180 therebetween. When so received, holes 212 in lower horizontal leg 182 mate with corresponding holes 214 in each support wall 210, said holes 212 and 214 being aligned and adapted to receive a quick release pin 216 therein to releasably secure lower horizontal leg 182 to said support walls 210.

Figure 14:
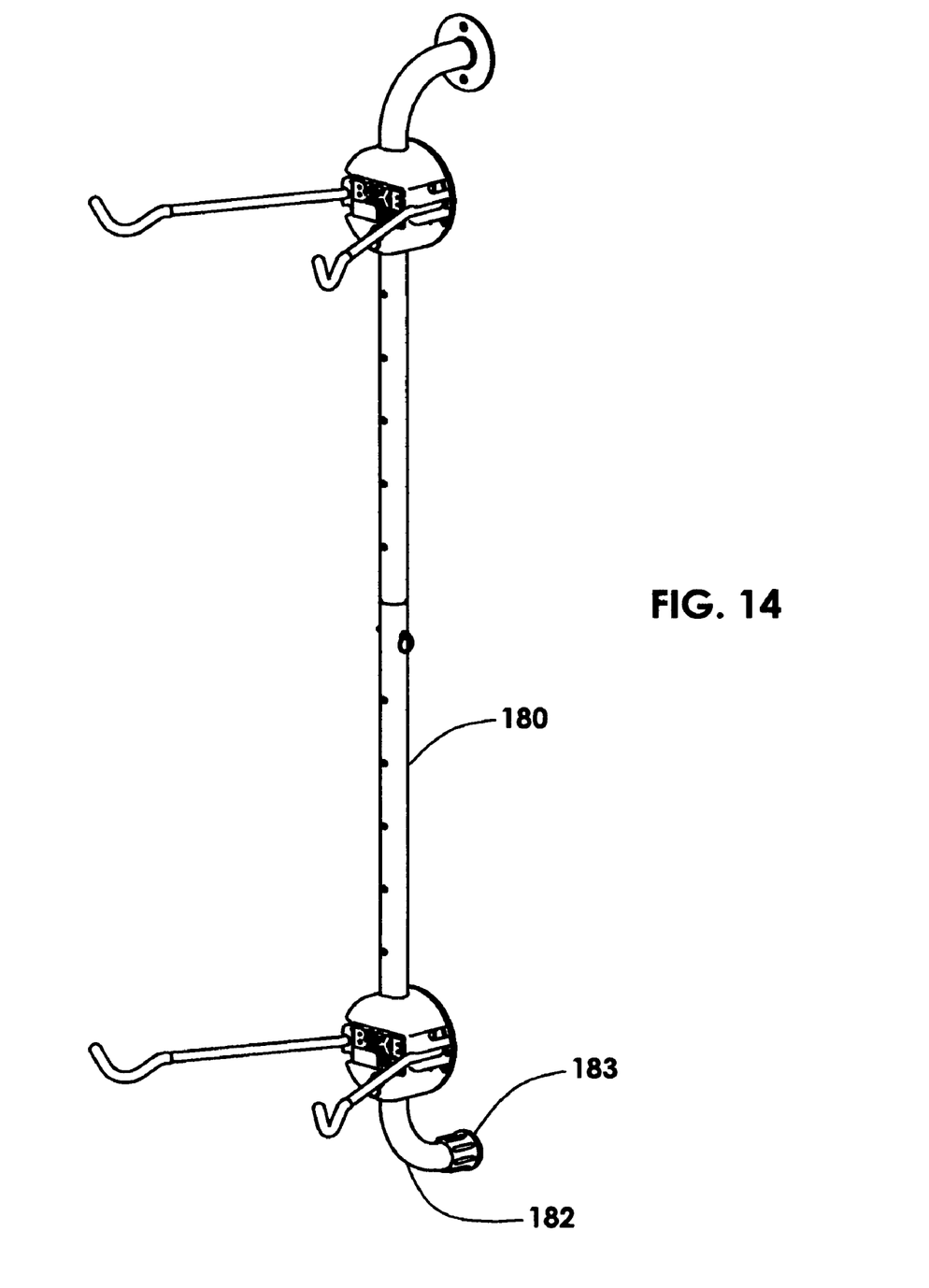
FIG. 14 is a perspective view of another embodiment of the wall mount version of the present invention.

In the presently preferred alternate embodiment depicted in FIG. 14, lower horizontal leg 182 opposite lower vertical leg 180 has a rubber cap 183 which engages wall 14.

As described, support device 170 is useable with the attachments such as hub 72 in the manner previously described. This particular embodiment provides firmer support for persons desiring a more permanent installation.

Figure 15:
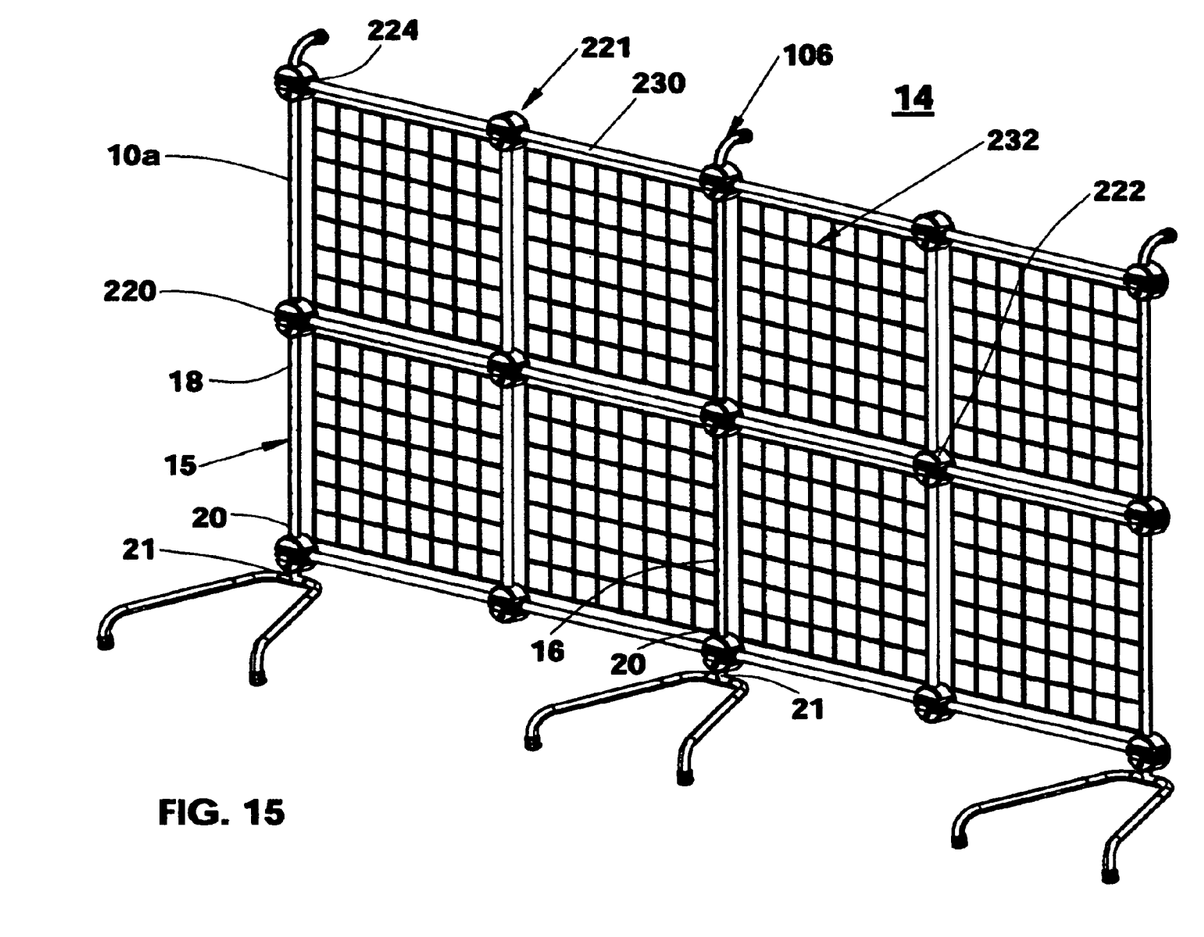
FIG. 15 is a front view of an alternate embodiment of the support structure having three connected wall supported modules supporting a grid structure for storage.

In an alternate embodiment best seen in FIG. 15, lateral connectors 221 comprising either one or more one way connectors 220 or one or more two way connectors 222 or a combination thereof are provided with openings 224.

Openings 224 are adapted to slidably receive base vertical portion 21 and upper end 18 and lower end 20 of vertical portions 15 as well as the ends of pipes 230. In the illustrated embodiments, openings 224 are aligned at 90 degrees from each other are provided whereby one way connector 220 forms a T-shape with three openings 224 while two way connector 222 has four openings 224 creating an X-shaped with the axis of the X at right angles.

To set up, two one way connectors 220 are positioned on a device 10a. One of the one way connectors 220 is positioned between both base vertical portion 21 and lower end 20 of vertical member 16 whereby opposing two openings 224 therein sidably receive base vertical portion 21 and end 20. The other one way connector 220 is preferably positioned between opposing an upper end 20 and a lower end 18 of abutting vertical portions 15 whereby opposing two openings 224 slidable received said ends 18 and 20. The third openings 224 of both one way connectors 220 extend laterally parallel to vertical wall 14 in the same direction from both of said two one way connectors.

On another device 10b on the side of device 10a which free openings 224 face, two two way connectors 222 are positioned on a device 10. One of the two way connectors 222 is positioned between both base vertical portion 21 and lower end 20 of vertical member 16 whereby opposing two openings 224 therein slidably receive base vertical portion 21 and end 20. The other two way connector 222 is preferably positioned between opposing an upper end 20 and a lower end 18 of abutting vertical portions 15 whereby opposing two openings 224 slidable received said ends 18 and 20. The other two openings 224 of both two way connectors 222 extend laterally parallel to vertical wall 14.

Extending between devices 10a and 10b are pipes 230 which extend from and are received within openings 224 in two way connectors 222 to be received within corresponding openings 224 in one way connectors 220. Pipes 230 provide mounting for other devices such a grid 232. Grid 232 or pipes 230 then provides mounting for such items as one or more baskets, hooks, hangers and the like.

Those skilled in the art will recognize that the embodiment shown and discussed in FIG. 15 is exemplary in nature and the invention is not limited thereto.

Although only certain embodiments have been illustrated and described, it will be apparent to those skilled in the art that various changes and modifications may be made therein without departing from the spirit of the invention or from the scope of the appended claims.

What is claimed is:

1. A modular storage support device for supporting a plurality of items suspended above a floor, the device adapted to mount to a wall, the device comprising:
an upper L-shaped member and a lower L-shaped member, the upper L-shaped member having an upper vertical leg and an upper horizontal leg, the lower L-shaped member having a lower vertical leg and a lower horizontal leg, the upper vertical leg opposite the upper horizontal leg being slidably received within the lower vertical leg opposite the lower horizontal leg, the lower horizontal leg and the upper horizontal leg extending in the same direction from the lower vertical leg and the upper vertical leg,
an upper wall mount and a lower wall mount affixed to a vertical wall, the upper horizontal leg and the lower horizontal leg opposite the upper vertical leg and the lower vertical leg being adapted to releasably mount to the upper wall mount and the lower wall mount, respectively,
one or more supports secured to the upper vertical leg and the lower vertical leg, each support is slidably receiving the vertical legs therein, the one or more supports having means to releasably secure the one or more supports to one of the upper vertical leg and the lower vertical leg, at least one support arm being mounted to each of the one or more supports, each of the at least one support arms adapted to engage an item for support of said item.

2. The device of claim 1 wherein each of the one or more supports comprises a hub.

3. The device of claim 2 wherein releasable securing means comprises a quick release pin mating with a hole in the hub, the quick release pin engaging one of a plurality of holes in the upper vertical leg and the lower vertical leg.

4. The device of claim 2 wherein the hub includes one pair of grooves, each of one of said pair of grooves being positioned 180 degrees from the other of said pair of grooves along the periphery of the hub, the grooves being adapted to receive the support arms.

5. The device of claim 2 wherein the hub includes three pairs of grooves, one of said three pairs of grooves being horizontally oriented, the other two pairs being aligned at an acute angle to the horizontally oriented pair of grooves.

6. The device of claim 5 wherein each pair of support arms are formed with a straight center piece having two short straight parallel sides extending laterally from the center, the support arms extending at an angel from the distal ends of the short straight parallel sides, the two short straight parallel sides adapted to be received within the grooves.

7. The device of claim 6 wherein in the hub comprises a front section and a rear section with the center piece captured therebetween.

8. The device of claim 7 wherein the front section is shaped as a cylinder having a sidewall and a disk covering one end thereof and an open end, the front section further having two sidewall openings on opposing sides of the sidewall, the sidewall openings being adapted to slidably receive the upper vertical leg and the lower vertical leg.

9. The device of claim 8 wherein the rear section is disk shaped and sized to cover the open end of the front section, the rear section further having two parallel tabs extending laterally from opposing sides of the rear section, each of the two parallel tabs having tab openings therethrough, the tab opening being slidably received within the upper vertical leg and the lower vertical leg therein, the tab openings aligning with the sidewall openings.

10. The device of claim 1 wherein the one or more supports comprise one or more bicycle supports which are adapted to be secured to the upper vertical leg and the lower vertical leg, each bicycle support having a collar adapted to slidably receive the vertical member and the elongated vertical portion, two support arms mounted to the collar, each of said support arms further having a holding member whose upper surface is formed into an arcuate groove of sufficient size to receive a bicycle tubular frame member.

11. The device of claim 1 wherein the upper wall mount comprises a disk which is positioned flat to the vertical wall and affixed thereto, the disk having a cylinder centered thereon and extending outwardly therefrom, the cylinder being slidably received with the upper horizontal leg.

12. The device of claim 1 wherein the lower wall mount comprises a plate which is positioned flat to the vertical wall and affixed thereto, the plate having two parallel support walls extending outwardly from the plate, the two support walls being adapted to receive the lower horizontal leg opposite the lower vertical leg therebetween, the two support walls having holes which align and mate with corresponding holes in the lower horizontal leg to receive a quick release pin therein to releasably secure the lower horizontal leg to the two support walls.

13. The device of claim 1 wherein the lower wall mount comprises a rubber cover.

* * * * *